(12) United States Patent
Hashimoto

(10) Patent No.: US 6,417,897 B1
(45) Date of Patent: Jul. 9, 2002

(54) FLAT-PANEL DISPLAY DEVICE IN WHICH AN EDGE OF THE LIGHT GUIDE PLATE IS SLANTED TO PROVIDE A VACANCY IN WHICH TO DISPOSE CIRCUITRY

(75) Inventor: Takeshi Hashimoto, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 133 days.

(21) Appl. No.: 09/591,619

(22) Filed: Jun. 9, 2000

(30) Foreign Application Priority Data

Jun. 10, 1999 (JP) .......................... 11-163204

(51) Int. Cl.⁷ .......................................... G02F 1/1335
(52) U.S. Cl. .......................................... 349/65; 349/150
(58) Field of Search ............................ 349/61, 62, 65, 349/150; 362/31

(56) References Cited

U.S. PATENT DOCUMENTS 6,133,978 A * 10/2000 Tajima ...................... 349/150

FOREIGN PATENT DOCUMENTS

JP 8-273417 10/1996

* cited by examiner

Primary Examiner—William L. Sikes
Assistant Examiner—Andrew Schechter
(74) Attorney, Agent, or Firm—Pillsbury Winthrop LLP

(57) ABSTRACT

A thin flat-panel display device having reduced picture-frame size (a width of non-displaying peripheral area) is provided without degrading the brightness. The flat-panel display device 1 comprises a display panel including a display cell, driving circuits connected to the display cell, and control circuit boards connected to the driving circuits, and a surface illuminant unit including a tubular light source disposed on one edge surface of a light guide plate. One of other edge surfaces adjacent to said one edge surface of the light guide plate, is inwardly inclined to form an acute angle θ relative to the light emitting surface of the light guide plate. In a vacancy created by the inclination of said other one of other edge surfaces, at least a part of the driving circuits or at least a part of the control circuit is disposed.

14 Claims, 4 Drawing Sheets

FLAT-PANEL DISPLAY DEVICE IN WHICH AN EDGE OF THE LIGHT GUIDE PLATE IS SLANTED TO PROVIDE A VACANCY IN WHICH TO DISPOSE CIRCUITRY

FIELD OF THE INVENTION

The present invention relates to a flat-panel display device with a reduced thickness and a reduced width of non-displaying peripheral area (referred as "a picture-frame size").

DESCRIPTION OF THE RELATED ART

During late years, flat-panel display devices are widely used in various fields for their advantageous features of thin and light-weight construction, and for low power consumption.

A light-transmission type liquid crystal display for example, comprises a display panel; and an edge-light-type surface illuminant unit for illuminating the display panel. The display panel includes a liquid crystal cell holding a liquid crystal layer between a pair of electrode substrates; and circuitry sections mounted on the electrode substrate, through which circuitry sections a signal driving circuit board and a scanning-line driving circuit board are electrically connected to the electrode substrate.

Conventionally, scanning line driving circuit boards are disposed substantially on the same plane as the liquid crystal substrate, while signal line driving circuit boards are disposed on the thinned section of a wedge-type light guide plate of the surface illuminant unit. The wedge-type light guide plate has a wedge shape in a cross sectional view taken perpendicular to its main surfaces and thus has the thinned section along one edge thereof.

In recent years, there is a demand for maximizing the display screen size or viewing area without changing the overall external size of a liquid crystal module. That is, reduction in the "picture-frame size" is desired. Accordingly, both the scanning line driving circuit board and the signal line driving circuit board are attempted to be disposed on a reverse side of the light guide plate, that is, on a main surface reverse to a light-emitting main surface of the light guide plate.

Since the above structure allows the placement of the surface illuminant unit and the circuitry section on the back side of the display cell, the structure enables to achieve further reduction in the "picture-frame size".

However, in the structure above, while one of the driving circuit boards, for example the signal line driving circuit board, can be disposed on the thinned section of the light guide plate, the other of the driving circuit boards, that is the scanning line driving circuit board have to be placed on the thicker section of the light guide plate, so that a resulted liquid crystal display device would have a large overall thickness.

When a thinner light guide plate is employed to reduce the thickness, the brightness decreases because the amount of light from a tubular light source introduced into the light guide plate decreases. Meanwhile, when electric current is increased to improve the brightness, the power consumption increases. Thus, it has been unable to achieve sufficient reduction in the thickness and the power consumption and improvement in brightness.

The present invention has been made in view of the above technical problems, and aims to provide a flat-panel display device having a reduced picture-frame size and a reduced overall thickness.

BRIEF SUMMARY OF THE INVENTION

According to one aspect of the present invention, a display panel comprises a display panel including a light-transmission type display cell, driving circuits electrically connected to said display cell and control circuit boards electrically connected to said display cell via said driving circuits; a surface illuminant unit including a substantially rectangular light guide plate and a tubular light source disposed on at least one edge surface of said light guide plate, one of its main surfaces of said light guide plate being a light-emitting surface, while said at least one edge surface being light-introducing surface(s); and a bezel holding said display panel interposed between it and said surface illuminant unit; wherein at least one adjacent edge surface adjacent to said light-introducing surface(s) is inwardly inclined to form an acute angle θ relative to said light emitting surface, so that at least a part of said driving circuits or at least a part of said control circuit boards is disposed in a vacancy created by the inclination of said adjacent edge surface.

According to the present invention, the driving circuits or the controlling circuit boards are partially or entirely disposed within the vacancy or recess created by the peculiar shape of the light guide plate, thereby decreasing the thickness of the flat-panel display device.

BRIEF DESCRIPTION OF THE DRAWINGS

FIG. 1A is a schematic perspective view; FIG. 1B is a schematic cross-sectional view taken along the line A—A in FIG. 1A; and FIG. 1C is a schematic cross-sectional view taken along the line B—B in FIG. 1A.

FIG. 2A is a schematic exploded perspective view; FIG. 2B is a schematic cross-sectional view taken along the line C—C in FIG. 2A.

DETAILED DESCRIPTION OF THE INVENTION

[Embodiment 1]

Now, an exemplary liquid crystal display device according to the first embodiment of the present invention will be described in detail with reference to the figures.

Figure 1A:
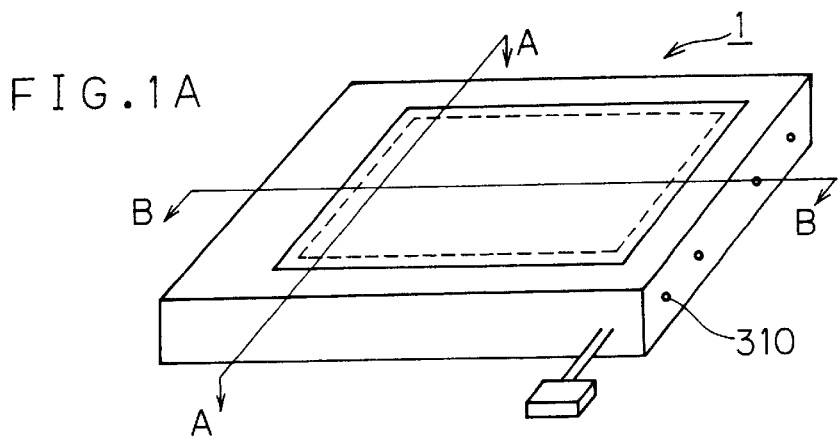
FIGS. 1A, 1B and 1C show a liquid crystal display device according to the first embodiment of the present invention.
Figure 1B:
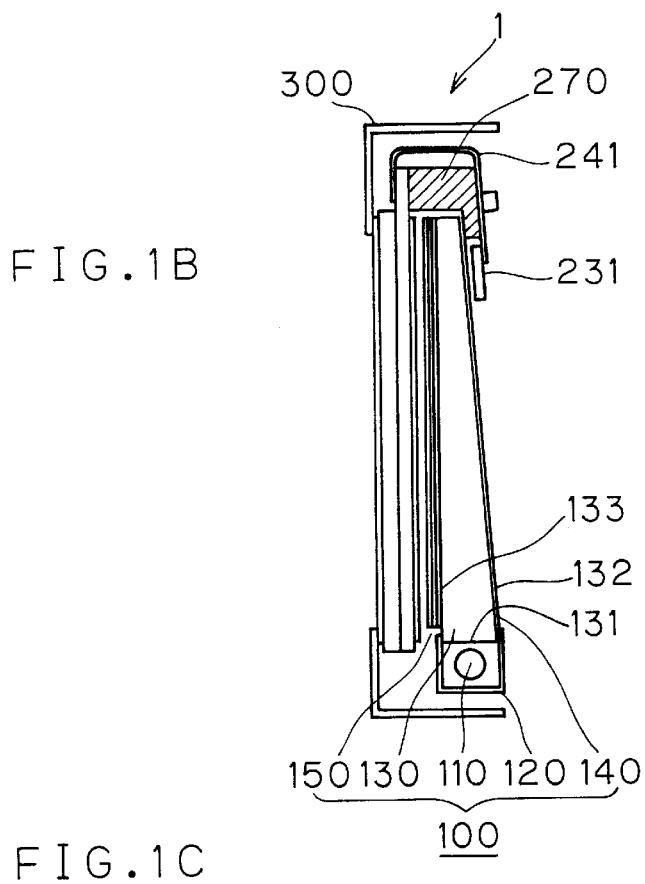
Figure 1C:
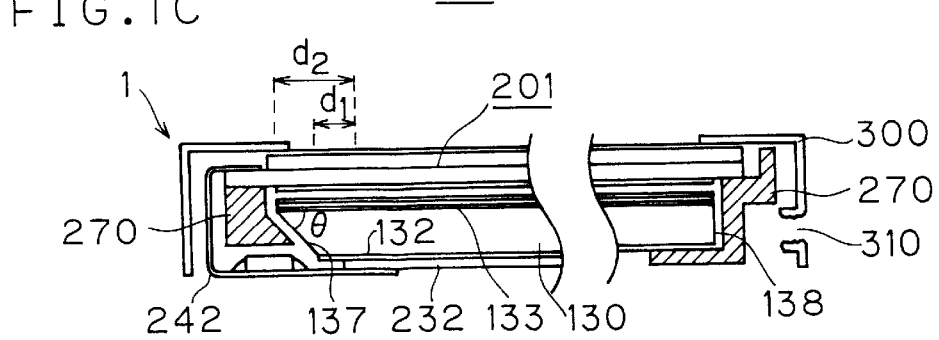

FIGS. 1A, 1B and 1C illustrate an example of a liquid crystal display device. FIG. 1A is a schematic perspective view; FIG. 1B is a schematic cross-sectional view taken along the line A—A in FIG. 1A; and FIG. 1C is a schematic cross-sectional view taken along the line B—B in FIG. 1A.

Figure 2A:
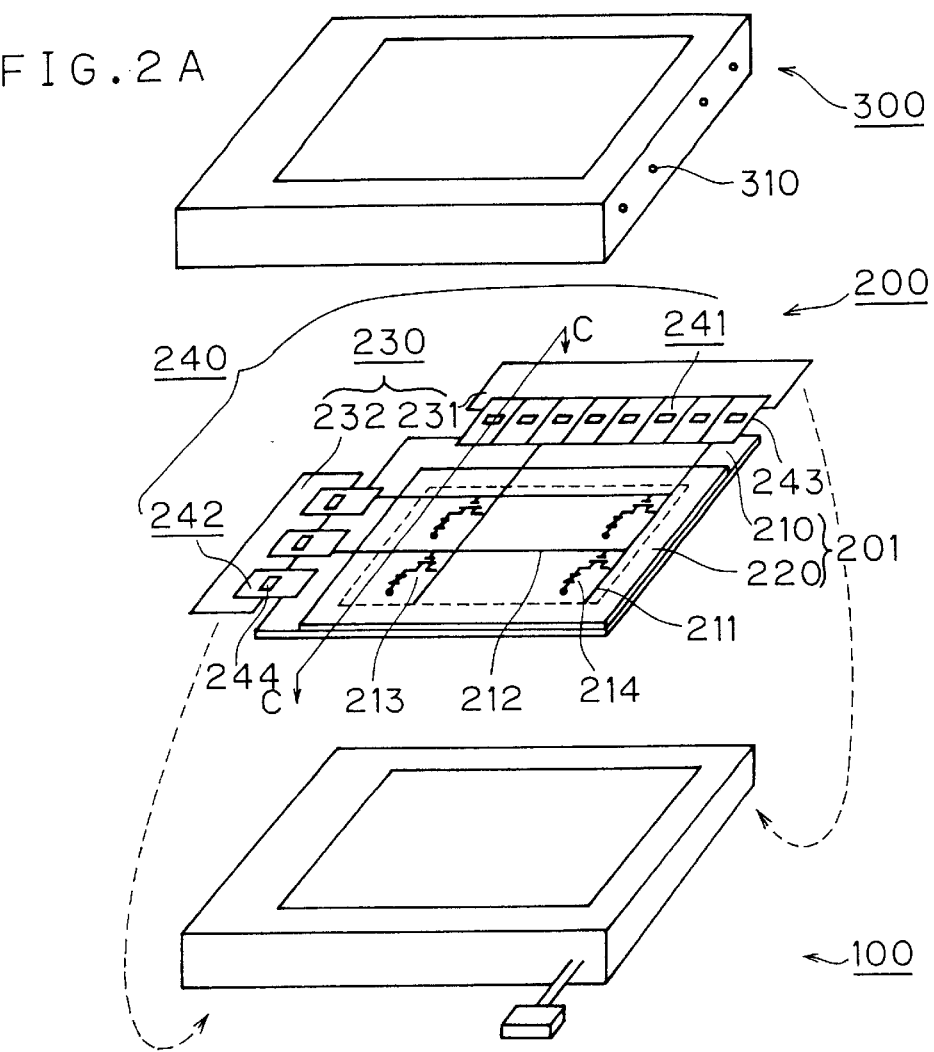
FIGS. 2A and 2B further illustrate the liquid crystal display device of the first embodiment.
Figure 2B:
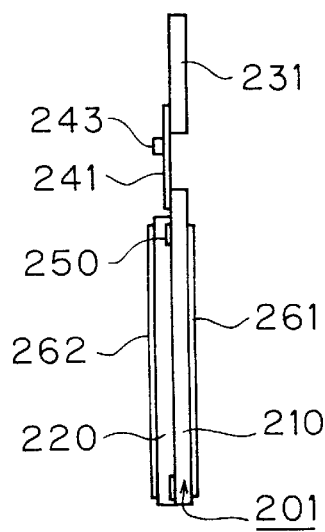

FIG. 2A is a schematic exploded perspective view of the liquid crystal display device shown in FIG. 1; and FIG. 2B is a schematic cross-sectional view of the display panel shown in FIG. 2A, taken along the line C—C.

The liquid crystal display device 1 in this embodiment comprises, as shown in FIGS. 1 and 2, a light-transmission type display panel 200 having an electric circuitry system incorporated therein; a surface illuminant unit 100; and a bezel (bezel cover) 300 for holding the display panel 200 between it and the surface illuminant unit 100. They are fixed to each other mainly by screws, and additionally by means of fitting engagement.

The display panel 200 comprises a control circuit boards 230 and a display cell 201 that includes an array substrate 210, a counter substrate 220, a liquid crystal layer of twisted nematic (TN) liquid crystal held between the substrates 210 and 220 via alignment layers (not shown). On the outer surfaces of the array substrate 210 and the counter substrate 220, polarizers 261, 262 are attached such that their polarization axes are orthogonal to each other.

The array substrate 210 and the counter substrate 220 of the display cell 201 are attached to each other by a sealant 250 that is disposed in a shape of a picture frame surrounding the viewing area.

The array substrate 210 comprises, on its transparent substrate made of glass, signal lines 211 disposed in parallel at an equal interval, scanning lines 212 disposed substantially orthogonal to the signal lines 211, thin film transistors (TFTs) disposed at respective intersections, and pixel electrodes 214 connected to the TFTs.

On the other hand, the counter substrate 220 which is disposed so as to face the array substrate 210, comprises a color filter, a counter electrode and an alignment layer, all of which are not shown, disposed on a transparent substrate made of glass.

The control circuit boards 230 include a first control circuit board 231 electrically connected to the signal lines 211, and a second control circuit board 232 electrically connected to the scanning lines 212.

The array substrate 210 of the display panel 200 and the control circuit boards 230 are connected via tape carrier packages (TCPs) 240, each of which includes a flexible wiring board having a driving IC (243, 244) mounted thereto. The TCPs 240 include "first" TCPs 241 each connected to the first control circuit board 231, and "second" TCPs 242 each connected to the second control circuit board 232.

Referring now to FIG. 1B, the surface illuminant unit 100 will be explained.

The surface illuminant unit 100 comprises: a light guide plate 130 having a shape substantially rectangular, with one of its main surfaces being light-emitting surface 133; a tubular light source 110 disposed on one edge surface of the light guide plate 130; a reflector 120 for introducing the light emitted from the tubular light source 110 into the light guide plate 130; an optical film 150 provided on the light emitting surface 133 of the light guide plate 130 for improving brightness and uniformity in brightness; and a reflective film 140 for reflecting the light escaping from a non-light-emitting main surface 132 (a reverse surface of the light guide plate 130, or a main surface reverse to the light-emitting surface 133) into the light-emitting surface 133.

The light guide plate 130 of the surface illuminant unit 100 is thickest along the light-introducing surface 131 on which the light from the tubular light source 110 is incident. As the distance from the tubular light source 110 increases, the thickness decreases. Thus, the light from the tubular light source is sufficiently taken into the light guide body. Moreover, light emission within the light-emitting surface becomes uniform since a distance between the non-light-emitting main surface and the light-emitting surface is smaller in a section away from the tubular light source.

Furthermore, as shown in FIG. 1C in which other edge surfaces adjacent to the light-introducing surface 131 (the edge surface of the light guide plate 130 on which the tubular light source 110 is disposed) are referred to as a first edge surface 137 and a second edge surface 138. The first edge surface 137, which is on the side where the second control circuit board 232 is to be disposed, is inwardly inclined to form an acute angle relative to the light emitting surface 133 of the light guide plate. To be specific, it is desirable that the following conditions are satisfied;

$30 \leq \theta \leq 80$, where $\theta$ is an angle formed by the light emitting surface 133 and the first edge surface 137 of the light guide plate 130;

$-2$ mm$\leq d_1 <1$ mm, where $d_1$ is a distance from the viewing area to the edge of the non-light-emitting main surface 132; and $d_2 \geq 1$ mm, where $d_2$ is a distance from the viewing area to the edge of the light emitting surface 133 of the light guide plate.

Utilizing the flexibility of TCP, the TCPs 240 are folded in order to place the control circuit boards 230 on the side of the non-light-emitting main surface 132 of the light guide plate 130. The first set and the second set of TCPs 241, 242 or the controlling circuit boards 230 is partly accommodated within the vacancy created by the acute-angle forming inclination. Then, they are held in place by a frame 270.

This "vacancy created by the acute-angle forming inclination" is a space within the bezel 300 created by inclining the first edge surface 137 of the light guide plate 130 to form an acute angle relative to the light emitting surface 133.

Figure 3:
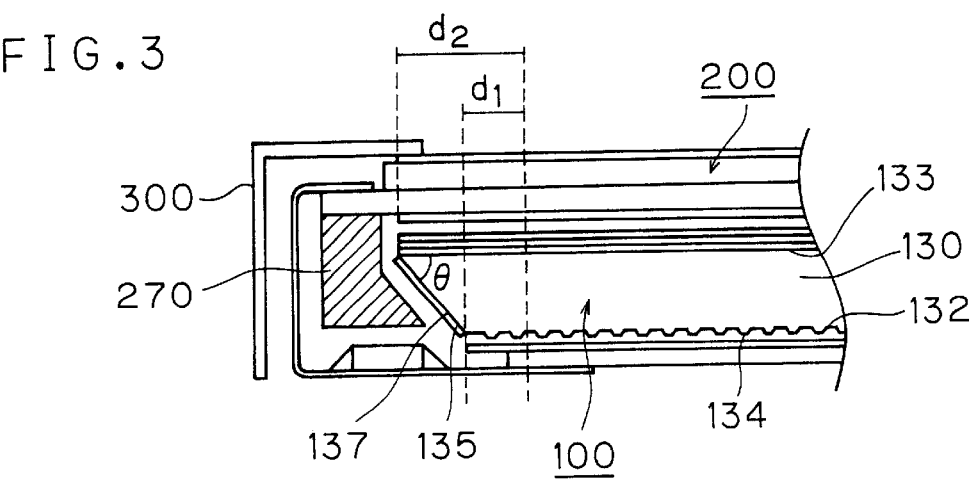
FIG. 3 is a schematic cross-sectional view of a liquid crystal display device according to the second embodiment.
Figure 4:
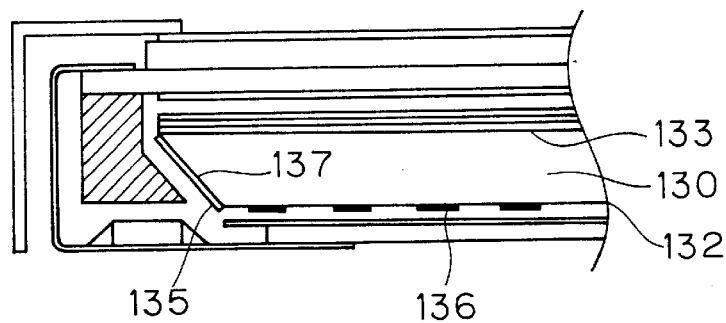
FIG. 4 is a schematic cross-sectional view of a liquid crystal display device according to the third embodiment.

In FIGS. 1C, 3 and 4 for example, the "vacancy" means the space between the light guide plate 130, the frame 270 and the bezel 300.

In either case, the TCPs 240 or the control circuit boards 230 is partly disposed in the "vacancy" created by inclination of the first edge surface 137 of the light guide plate 130 to form an acute angle relative to the light emitting surface 133, so that the thickness and the picture-frame size of the liquid crystal display device 1 are reduced.

Furthermore, screw holes 310 are provided in the bezel 300 for attaching the frame 270 and the bezel 300 to the housing which receives the liquid crystal display device, so that further reduction in the picture-frame size of the liquid crystal display device 1 is achieved.

[Embodiment 2]

Now, with reference to FIG. 3 which illustrates an exemplary 14.1 XGA LCD (Liquid crystal Display), a second embodiment of the present invention will be explained.

In this embodiment, $\theta=60°$, $d_1=0.5$ mm and $d_2=1.0$ mm are met; disk-shaped fine dots 134 having a diameter of 0.1 mm and a thickness of 0.01 mm are formed on the non-light-emitting main surface 132 of the light guide plate 130; and a reflective tape 135 is disposed on the first edge surface 137 which is inclined to form an acute angle relative to the light emitting surface 133 of the light guide plate 130.

Because of the fine dots 134 formed on the non-light-emitting main surface 132, the light emission from the light guide plate 130 is made uniform. More specifically, these fine dots 134 are distributed denser as the distance from the tubular light source 110 increases, so that the light emission distribution within the light-emitting surface 133 is made uniform. In this embodiment, the light guide plate 130 including the fine dots 134 is made of an acrylate resin such as PMMA (poly methyl methacrylate), and is fabricated by an injection molding process.

Furthermore, the reflective tape 135 disposed on the first edge surface 137 (the edge surface of the light guide plate 130 inclined to form an acute angle relative to the light emitting surface 133), improves the uniformity in brightness.

Within the vacancy between this edge surface forming the acute angle, the frame 270 and the bezel 300, the second TCPs are partly disposed. Especially, the driving ICs 244 each mounted on the second TCPs 242 are partly disposed in the vacancy.

In this manner, a thickness of 5.7 mm and a brightness of 150 cd/m$^2$ were achieved for a liquid crystal display device.

[Embodiment 3]

The third embodiment of the present invention is now explained with reference to FIG. 4.

Light-diffusing reflective dots or light-diffusing transmissive dots 136 are provided on the non-light-emitting main surface 132 of the light guide plate 130 as shown in FIG. 4 to improve the uniformity in brightness, whereas the disk-shaped fine dots 134 are formed on the non-light-emitting main surface 132 in the second embodiment.

Moreover, the reflective tape 135 is disposed on the first edge surface 137, or a edge surface which is inclined to form an acute angle relative to the light emitting surface 133 of the light guide plate 130, so as to further improve the uniformity. The reflective tape 135 may be replaced by a light absorbing tape in a specific intended use where the reflective tape 135 causes to locally brighten the section of this edge surface and thereby causes a problematic unevenness in the brightness.

[Embodiment 4]

Figure 5:
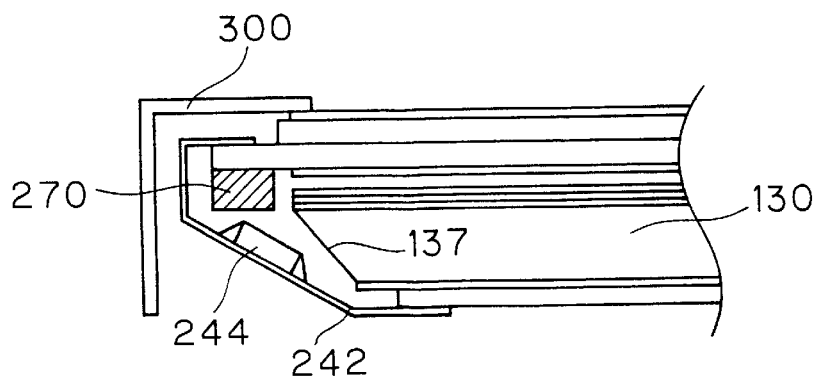
FIG. 5 is a schematic cross-sectional view of a liquid crystal display device according to the fourth embodiment.

The forth embodiment of the present invention will now be explained with reference to FIG. 5.

In this embodiment, while the frame 270 is only provided at the upper section of the first edge surface inclined to form the acute angle, the TCPs 242 are laid along the first edge surface inclined to form the acute angle, so that the driving ICs 244 of the TCPs 242 are disposed on the vacancy.

[Embodiment 5]

Figure 6:
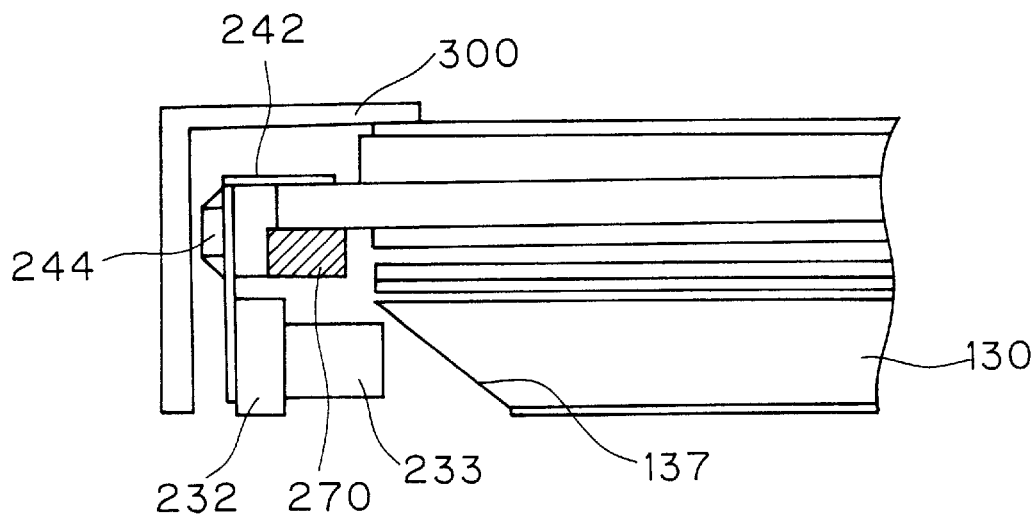
FIG. 6 is a schematic cross-sectional view of a liquid crystal display device according to the fifth embodiment.

The fifth embodiment of the present invention will be explained with reference to FIG. 6.

In this embodiment, while the frame 270 is only provided at the upper section of the first edge surface inclined to form the acute angle as in the Embodiment 5, the TCPs 242 and the driving ICs 244 are disposed along the sidewall of the bezel 300. The control circuit board 232 connected to the TCPs 242 is disposed also along the sidewall of the bezel 300, so that components 233 mounted on the control circuit board are disposed in the vacancy.

[Embodiment 6]

Figure 7:
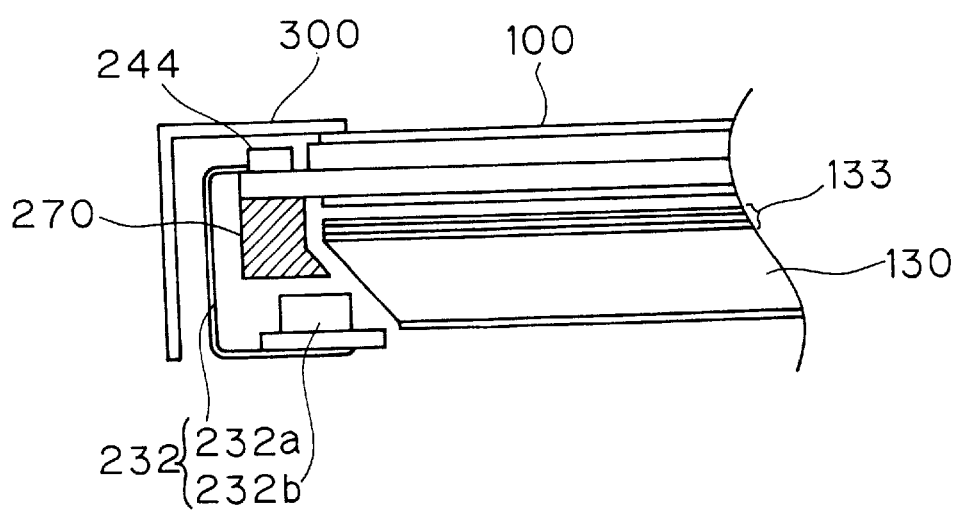
FIG. 7 is a schematic cross-sectional view of a liquid crystal display device according to the sixth embodiment.

The sixth embodiment of the present invention is explained with reference to FIG. 7.

This embodiment employs a COG (Chip On Glass) technique in which a part or all of the driving circuits or the driving IC 244 are directly mounted on peripheral portions of the array substrate 210. In other wise, using a polycrystalline silicon film for TFT, the driving circuits may be formed on the array substrate per se on which the TFTs for pixels are formed.

In this embodiment, the control circuit board 232 comprises a flexible printed board 232a and a circuit board 232b, and this flexible printed board 232 is folded along the first edge surface 137 of the light guide plate 130 to place the components 233 of the circuit board 232b within the open space.

As explained heretofore, a sufficient reduced thickness can be achieved for a liquid crystal display device because at least one of the edge surfaces adjacent to the light-introducing surface of the light guide plate is inclined to form an acute angle relative to the light emitting surface, and because the vacancy created by the inclination accommodates a part of the TCPs or a part of the control circuit boards.

The degradation in brightness is minimized because the inclination is in a manner to form the acute angle.

In addition, the two pieces of the control circuit boards and the surface illuminant unit are disposed on the backside of the display cell, so as to reduce the picture-frame size.

Moreover, a light absorbing property or light reflecting property may be given to the inclined edge surface, so as to improve the brightness uniformity of the light-emitting surface.

In the embodiments above discussed, the display cell has been explained as being TN mode, however, the present invention is also applicable to any other light-transmission type liquid crystal display device. In case of the other light-transmission type forming the driving circuits on the substrate, the number of electrical connections between the display cell and external components can be reduced while the external circuitry can be compactly configured, so as to achieve further miniaturization.

According to the present invention, since a part of driving circuits or a part of control circuit boards is disposed in the vacancy formed by the peculiar shape of light guide, thickness of a flat-panel display device is reduced.

What is claimed is:

1. A flat-panel display device comprising:
    a display panel including a light-transmission type display cell, driving circuits electrically connected to said display cell and control circuit boards electrically connected to said display cell via said driving circuits;
    a surface illuminant unit including a substantially rectangular light guide plate and a tubular light source disposed on at least one edge surface of said light guide plate, one of the main surfaces of said light guide plate being a light-emitting surface, said at least one edge surface being a light-introducing surface(s); and
    a bezel holding said display panel interposed between it and said surface illuminant unit;
    wherein at least one adjacent edge surface adjacent to said light introducing surface(s) is inwardly inclined to form an acute angle θ relative to said light emitting surface, so that at least a part of said driving circuits or at least a part of said control circuit boards is disposed in a vacancy created by the inclination of said adjacent edge surface; and
    wherein said light emitting surface of the light guide plate is adjacent to said at least one adjacent edge surface.

2. A flat-panel display device according to claim 1 wherein said adjacent edge surface has a light absorbing property.

3. A flat-panel display device according to claim 1 wherein said adjacent edge surface has a light reflecting property.

4. A flat-panel display device according to claim 1 wherein said flat-panel display device has screw holes on an edge surface of said bezel as means for fastening the flat-panel display device to housing which accommodates it.

5. A flat-panel display device according to claim 1 wherein said driving circuits are TCPs connected to peripheral portions of an array substrate of said display cell.

6. A flat-panel display device according to claim 1 wherein said driving circuits are driving ICs provided on peripheral portions of an array substrate of said display cell, and at least a part of said control circuit boards is disposed along said adjacent edge surface.

7. A flat-panel display device according to claim 1 wherein said acute angle θ is between 30° and 80°.

8. A flat-panel display device according to claim 1 wherein an outward distance from a verge of a viewing area to a verge of a non-light-emitting main surface of said light guide plate is between −2 mm to 1 mm.

9. A flat-panel display device according to claim 1 wherein an outward distance from a verge of a viewing area to a verge of said light emitting surface of said light guide plate is at least 1 mm.

10. A flat-panel display device comprising:
a display panel including a light-transmission type display cell, driving circuits electrically connected to said display cell and control circuit boards electrically connected to said display cell via said driving circuits;
a surface illuminant unit including a substantially rectangular light guide plate and a tubular light source disposed on at least one edge surface of said light guide plate, one of its main surfaces of said light guide plate being a light emitting surface, said at least one edge surface being a light-introducing surface(s); and
a bezel holding said display panel interposed between it and said surface illuminant unit;
wherein said driving circuits are tape carrier packages (TCPs) connected to an array substrate of said display cell, at least one adjacent edge surface adjacent to said light-introducing surface(s) is inclined to form an acute angle θ relative to said light emitting surface, so that said tape carrier packages (TCPs) are folded to extend along said adjacent edge surface; and
wherein said light emitting surface of the light guide plate is adjacent to said at least one adjacent edge surface.

11. A flat-panel display device according to claim 10 wherein each of said tape carrier packages (TCPs) includes a driving IC which is disposed along said adjacent edge surface.

12. A flat-panel display device according to claim 10 wherein each of said tape carrier packages (TCPs) includes a driving IC which is located close to a non-light-emitting main surface of the light guide plate and along said adjacent edge surface so that the driving ICs are disposed in a vacancy created by the inclination of said adjacent edge surface.

13. A flat-panel display device comprising:
a display panel including a light-transmission type display cell, driving circuits electrically connected to said display cell and control circuit boards electrically connected to said display cell via said driving circuits;
a surface illuminant unit including a substantially rectangular light guide plate and a tubular light source disposed on at least one edge surface of said light guide plate, one of its main surfaces of said light guide plate being a light-emitting surface, while said at least one edge surface being light-introducing surface(s); and
a bezel holding said display panel interposed between it and said surface illuminant unit;
wherein at least one adjacent edge surface adjacent to said light introducing surface(s) is inwardly inclined to form an acute angle θ relative to said light emitting surface, so that at least a part of said driving circuits or at least a part of said control circuit boards is disposed in a vacancy created by the inclination of said adjacent edge surface; and
wherein said adjacent edge surface has a light absorbing property.

14. A flat-panel display device comprising:
a display panel including a light-transmission type display cell, driving circuits electrically connected to said display cell and control circuit boards electrically connected to said display cell via said driving circuits;
a surface illuminant unit including a substantially rectangular light guide plate and a tubular light source disposed on at least one edge surface of said light guide plate, one of its main surfaces of said light guide plate being a light-emitting surface, said at least one edge surface being light-introducing surface(s); and
a bezel holding said display panel interposed between it and said surface illuminant unit;
wherein at least one adjacent edge surface adjacent to said light introducing surface(s) is inwardly inclined to form an acute angle θ relative to said light emitting surface, so that at least a part of said driving circuits or at least a part of said control circuit boards is disposed in a vacancy created by the inclination of said adjacent edge surface; and
wherein said adjacent edge surface has a light reflecting property.

* * * * *